Jan. 14, 1930. C. ADAMS 1,743,842

VEHICLE

Filed Dec. 13, 1927

Carl Adams
INVENTOR.
BY
his ATTORNEY.

Patented Jan. 14, 1930

1,743,842

UNITED STATES PATENT OFFICE

CARL ADAMS, OF ROCHELLE PARK, NEW JERSEY

VEHICLE

Application filed December 13, 1927. Serial No. 239,620.

This invention relates to vehicles and it particularly relates to vehicles propelled by human power, the object of the invention being to provide a vehicle intended primarily for the amusement of children as well as for their bodily exercise.

It is, however, a further object of the invention to provide a vehicle of a construction which will allow also invalids to avail themselves of the device for their transportation; it is a further object of the invention to provide means which will allow the owner of the same to travel with a greater speed than is possible with the type of wagons now usually presented to boys of older age.

It is, in view of the purposes stated above, another object of the invention to provide such a vehicle at a low price and which, though simple in construction, allows the operator to use it as a substitute for an automobile which in itself would be too dangerous to be entrusted to a boy.

In the following I am going to describe, by way of example, one preferred embodiment of my new hand propelled vehicle, reference being had to the accompanying drawings, forming part of the specification; in said drawings Figure 1 is a top view of the vehicle, showing the propelling means and the braking device, the seat for the driver being not shown so as to render other parts visible;

Figure 1:
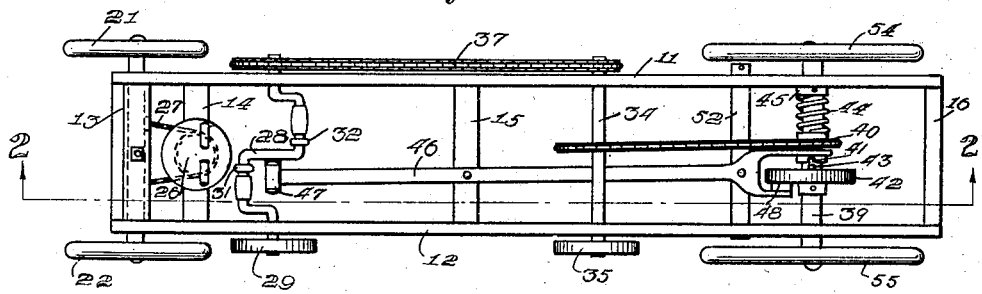

The frame-like body of the vehicle consists of the side walls 11 and 12 and of the horizontal braces 13, 14, 15 and 16 arranged horizontally and perpendicularly to the aforesaid sidewalls of the body so as to give the same greater stability.

An axle 17 is secured to below a wooden swivel joined block 18, or any other similar means, which furthermore is provided in the center of its upper side with a stud or bolt 19 passing through and being rotarily arranged in an aperture (not shown) in the center of the brace 13 above which the stud 19 is held by a nut 20; wheels 21 and 22 are operatively secured to the axle 17 at the sidewalls 11 and 12, respectively. A short shaft 23 is vertically and rotarily arranged in the center of the brace 14; the upper end of said shaft 23 is provided with an annular turn table 24 rigidly secured thereon in any suitable manner. In order to facilitate turning this table with the feet, two studs or pedals 25 are vertically arranged on the table in a short suitable distance from each other.

A sprocket wheel 26 is secured in any of the well known ways to the lower end of the shaft 23 and engages a sprocket chain 27 secured with its ends to the block 18 equidistantly from the bolt 19. A washer 53 is slipped over the bolt 19 and interposed between brace 13 and block 18 so as to reduce friction between the latter parts. A crankshaft 28 is rotarily arranged in the front part of the vehicle in suitable journals (not shown) near the upper rim of the side walls 11 and 12; on its left side a flywheel 29 and on the right side a sprocket-wheel 30 are secured in any of the well known ways to the crankshaft 28, the flywheel and the sprocket wheel being of the same diameter which is approximately the height of the crankshaft. The horizontal bars of the latter are provided with shells to protect the hands of the operator from injury by friction and adjoining these shell stirrups 31 and 32 are depending from the crankshaft 28. 33 represents the seat for the driver; in the rear of this seat an intermediate rotary shaft 34 is arranged horizontally and perpendicular to and in the sidewalls 11 and 12 in proper journals (not shown); the right end of this shaft is provided with a flywheel 35 and the left one with a sprocketwheel 36 of approximately one half the diameter of the sprocketwheel 30, both wheels being secured to the shaft 34 in any suitable manner. A sprocket-chain 37 operatively engages the sprocketwheels 30 and 36. In approximately the middle of shaft 34 a sprocketwheel 38 is rigidly secured in a suitable manner, its diameter being approximately the same as that of sprocketwheel 30.

In the rear of the vehicle a rotary axle 39 is arranged horizontally and perendicularly to the side walls 11 and 12 in journals (not shown) and is provided with a wheel 54 and 55 at its ends, respectively; in approximately its middle a sprocketwheel 40, having a notch 41 in its hub, is loosely arranged thereon so as to engage the adjoining stationary wheel 42 having a projection 43 fitting into aforesaid notch 41, rigidly secured to the axle 39. It is obvious that the sprocketwheel 40 thus acts as a clutch in cooperation with the stationary or brakewheel 42.

An expansion coil 44 is slipped over the axle 39 and presses against the collar 45 secured thereon and against the loose sprocketwheel 40.

Figure 2:
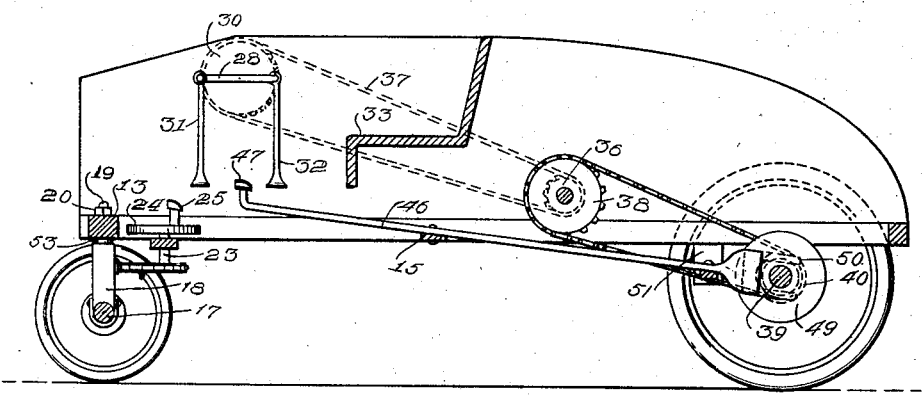
Fig. 2 is a vertical sectional view along the line 2—2 of the Figure 1, the seat of the driver being shown therein.
Figure 3:
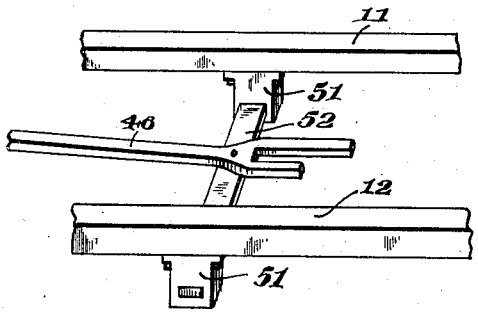
Figure 3 is a detail view of the rear mounting for the brake and clutch operating rod.

A long lever 46 is pivotally secured to the base 15 and is provided at its foremost end with a pedal 47, while its rear end is given a double fork-shape; the one end of this fork is plate-like and short and is provided with a friction pad 48, made of any material capable of withstanding the heat caused by the friction between the pad and the brakewheel 42 if they occasionally come to play on each other; the other side of the fork is split into two longer fingers 49 and 50 fitting into a groove in the hub of sprocketwheel 40 as indicated by Figure 2.

Brackets 51 are secured below the body of the vehicle between the axles 34 and 39 and a bar 52 slides within said bracket in suitable ports (not shown) parallel to the said axles 34 and 39.

Sprocket wheels 38 and 40 are operatively connected by a sprocket chain 56.

The operation of the vehicle is obvious. The operator turns the crankshaft 28 with his hands and directs the front wheels by actuating the turntable 24 either to the left or to the right by putting one foot on each of the pedals 25 and pushing them to the respective side. If the vehicle is to go up-hill, the operator may step into the stirrups 31 and 32 and may thus actuate the crankshaft 28 with his hands and feet. If the car is to start, the operator steps on the pedal 47 and pushes it towards the sidewall 11 whereupon the brake pad disengages from the brake wheel 42 and the sprocketwheel 40 engages the same by having the notch 41 snap over the projection 43; if the vehicle is to stop, the pedal 47 is pushed towards the sidewall 12. Owing to the relations in the size of the diameters of the sprocketwheels engaging the crankshaft 34, the vehicle can be easily operated and obtain great speed if desired.

What I claim is:

1. In a vehicle, the combination of a body and supporting wheels therefor, a hand crank mounted transversely of said body adjacent the front thereof, gearing means secured to said hand crank, foot stirrups rotatably supported on said crank and depending therefrom, a rotary shaft transversely arranged in approximately the middle of the body and having gearing means secured thereto, a rotary axle transversely arranged adjacent the rear of the body, having supporting wheels rigidly secured at its outer ends and a clutch intermediate said wheels, a spring actuated gearing wheel, slidably arranged on said rotary axle and adapted to operatively engage the clutch, and means for transmitting power from the crank to the intermediate shaft and to the rotary axle.

2. In a vehicle the combination of a body and supporting wheels therefor, a hand crank mounted transversely of said body adjacent the front thereof, a sprocket wheel secured to the outer end of said hand crank, foot stirrups rotatably supported on said crank and depending therefrom, a rotary shaft transversely arranged in approximately the middle of the body and having sprocket wheels secured thereto, a rotary axle, transversely arranged adjacent the rear of the body, having supporting wheels rigidly secured at its outer ends and a clutch intermediate said wheels, a spring actuated sprocket wheel, slidably arranged on said rotary axle and adapted to operatively engage the clutch, and a chain device for transmitting power from the sprocket wheel on the crank to those on the intermediate shaft and on the rotary axle.

CARL ADAMS.